US011079062B2

(12) United States Patent
Lin et al.

(10) Patent No.: US 11,079,062 B2
(45) Date of Patent: Aug. 3, 2021

(54) DISPLAY DEVICE

(71) Applicant: Top Victory Investments Limited, Hong Kong (HK)

(72) Inventors: Yi-Sheng Lin, New Taipei (TW); Chia-Yu Liu, New Taipei (TW); Tung-Jung Hsueh, New Taipei (TW)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 0 days.

(21) Appl. No.: 16/839,032

(22) Filed: Apr. 2, 2020

(65) Prior Publication Data
US 2021/0180741 A1     Jun. 17, 2021

(30) Foreign Application Priority Data

Dec. 17, 2019   (TW) ................................ 108146191

(51) Int. Cl.
| *F16M 11/12* | (2006.01) |
| *F16M 11/20* | (2006.01) |
| *F16M 11/18* | (2006.01) |

(52) U.S. Cl.
CPC ............. *F16M 11/12* (2013.01); *F16M 11/18* (2013.01); *F16M 11/2035* (2013.01)

(58) Field of Classification Search
CPC ........ F16M 11/08; F16M 11/12; F16M 11/18; F16M 11/2035; Y10S 248/917; Y10S 248/92; Y10S 248/922
See application file for complete search history.

(56) References Cited

U.S. PATENT DOCUMENTS

| 1,731,011 | A | * | 10/1929 | Krawitz | ................... | A47F 5/025 |
| | | | | | | 40/473 |
| 4,796,842 | A | * | 1/1989 | Hamada | ................... | F16F 1/024 |
| | | | | | | 248/186.2 |
| 4,905,543 | A | * | 3/1990 | Choi | ...................... | F16M 11/18 |
| | | | | | | 74/827 |
| 4,969,290 | A | * | 11/1990 | Skoretz | .................... | A01G 9/04 |
| | | | | | | 108/20 |
| 5,090,823 | A | * | 2/1992 | Lindsey | ................. | F16M 11/18 |
| | | | | | | 384/605 |
| 5,243,434 | A | * | 9/1993 | Nodama | ................ | F16M 11/08 |
| | | | | | | 248/550 |
| 5,749,556 | A | * | 5/1998 | Matsuoka | .............. | F16M 11/08 |
| | | | | | | 248/349.1 |
| 6,231,020 | B1 | * | 5/2001 | Willson | ................. | A47B 11/00 |
| | | | | | | 248/349.1 |

(Continued)

*Primary Examiner* — Eret C Mcnichols
(74) *Attorney, Agent, or Firm* — Hamre, Schumann, Mueller & Larson, P.C.

(57) ABSTRACT

A display device includes a monitor and a support module including a base frame, a support frame and a driving unit. The base frame includes a base seat and a rotating seat connected to the base seat and rotatable about an axis. The support frame includes a connecting mechanism connected to the monitor, and a support member connected co-rotatably to the rotating seat and connected to the connecting mechanism. The driving unit includes a drive subunit co-rotatably secured to the rotating seat, and a control subunit mounted to the base seat, connected to the drive subunit, and being operable to drive rotation of the rotating seat about the axis via the drive subunit, thereby rotating the monitor about the axis.

8 Claims, 10 Drawing Sheets

(56) References Cited

U.S. PATENT DOCUMENTS

| | | | | |
|---|---|---|---|---|
| 6,536,362 B2* | 3/2003 | Clarke | D05B 75/00 | 112/217.2 |
| 7,644,903 B2* | 1/2010 | Amato | F16M 13/00 | 248/349.1 |
| 7,708,239 B2* | 5/2010 | Watanabe | F16M 11/08 | 248/125.7 |
| 7,758,005 B2* | 7/2010 | Uemura | H04N 5/64 | 248/346.06 |
| 7,762,513 B2* | 7/2010 | Sawai | F16M 11/18 | 248/349.1 |
| 7,950,610 B2* | 5/2011 | Sawai | F16M 11/2014 | 248/131 |
| 8,094,244 B2* | 1/2012 | Sawai | F16M 11/10 | 348/836 |
| 2004/0178314 A1* | 9/2004 | Chen | F16M 11/24 | 248/349.1 |
| 2005/0194509 A1* | 9/2005 | Tsai | F16M 11/08 | 248/349.1 |
| 2007/0007401 A1* | 1/2007 | Corporation | F16M 11/22 | 248/125.7 |
| 2007/0221798 A1* | 9/2007 | Lin | F16M 11/08 | 248/176.1 |
| 2007/0221810 A1* | 9/2007 | Liao | F16M 11/18 | 248/425 |
| 2008/0035821 A1* | 2/2008 | Kameoka | F16M 11/22 | 248/349.1 |
| 2008/0100997 A1* | 5/2008 | Chen | G06F 1/1601 | 361/679.01 |
| 2008/0111928 A1* | 5/2008 | Yokota | F16M 11/12 | 348/836 |
| 2008/0111929 A1* | 5/2008 | Yokota | F16M 11/22 | 348/836 |
| 2008/0149800 A1* | 6/2008 | Katsumata | F16M 11/38 | 248/349.1 |
| 2008/0192419 A1* | 8/2008 | Sawai | F16M 11/2014 | 361/679.06 |
| 2008/0272262 A1* | 11/2008 | Katsumata | F16M 11/08 | 248/349.1 |
| 2009/0284668 A1* | 11/2009 | Sawai | F16M 11/2014 | 348/836 |
| 2012/0067149 A1* | 3/2012 | Yoon | F16M 11/22 | 74/414 |
| 2012/0325985 A1* | 12/2012 | Slowinski | F16M 13/02 | 248/121 |
| 2016/0069510 A1* | 3/2016 | Chen | F16C 11/10 | 248/206.5 |

\* cited by examiner

DISPLAY DEVICE

CROSS-REFERENCE TO RELATED APPLICATION

This application claims priority of Taiwanese Invention Patent Application No. 108146191, filed on Dec. 17, 2019.

FIELD

The disclosure relates to a display device, more particularly to a display device with a support module.

BACKGROUND

For a conventional desktop display, when the viewing angle needs to be changed, a force is usually applied by hand to the frame of the screen to turn the screen to the left or the right.

Recent technology advancements have made frameless screens possible. If one tries to move a frameless screen, force is applied directly to the screen which may leave fingerprints and smears on the screen. Moreover, if the screen is large in size, a larger force would need to be applied to move the screen, increasing the risk of breaking the screen.

SUMMARY

Therefore, the object of the disclosure is to provide a display device that can alleviate at least one of the drawbacks of the prior art.

According to the disclosure, a display device includes a monitor and a support module including a base frame, a support frame and a driving unit.

The base frame includes a base seat and a rotating seat connected to the base seat and rotatable about an axis. The support frame includes a connecting mechanism connected to the monitor, and a support member connected co-rotatably to the rotating seat and connected to the connecting mechanism. The driving unit includes a drive subunit co-rotatably secured to the rotating seat, and a control subunit mounted to the base seat, connected to the drive subunit, and being operable to drive rotation of the rotating seat about the axis via the drive subunit, thereby rotating the monitor about the axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
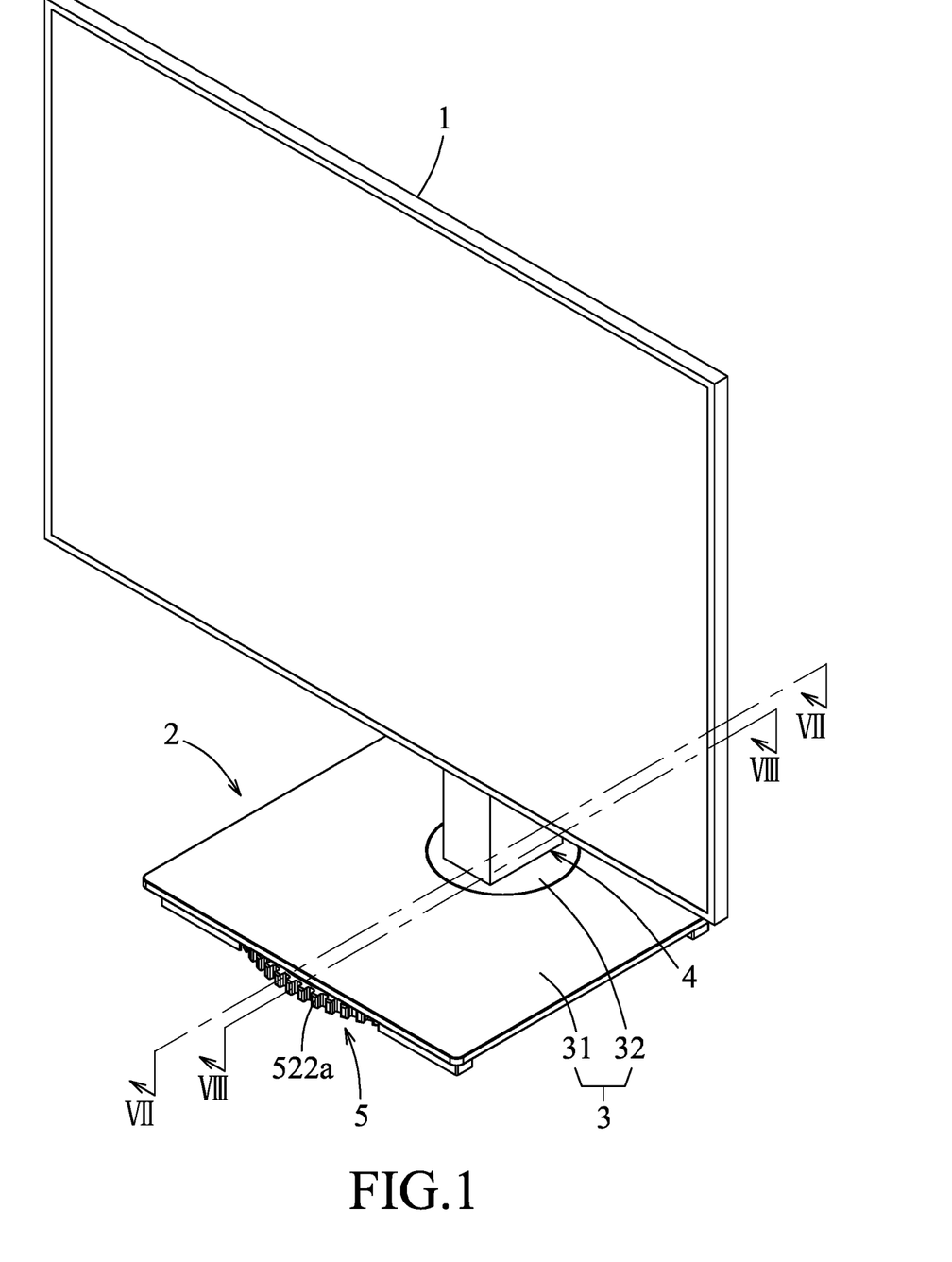
FIG. 1 is a perspective view of an embodiment of a display device according to the disclosure.
Figure 2:
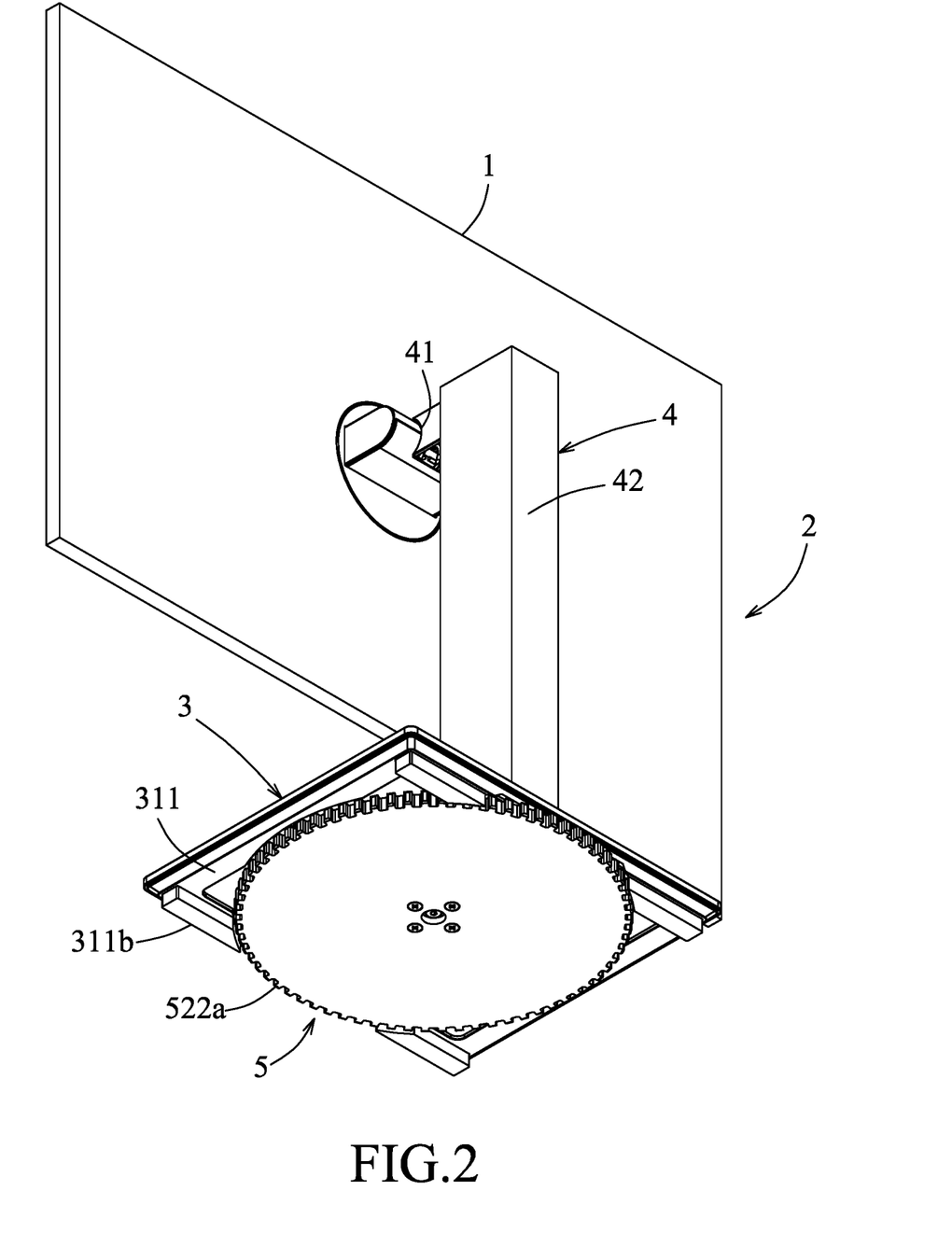
FIG. 2 is a perspective view of the embodiment from another angle.
Figure 3:
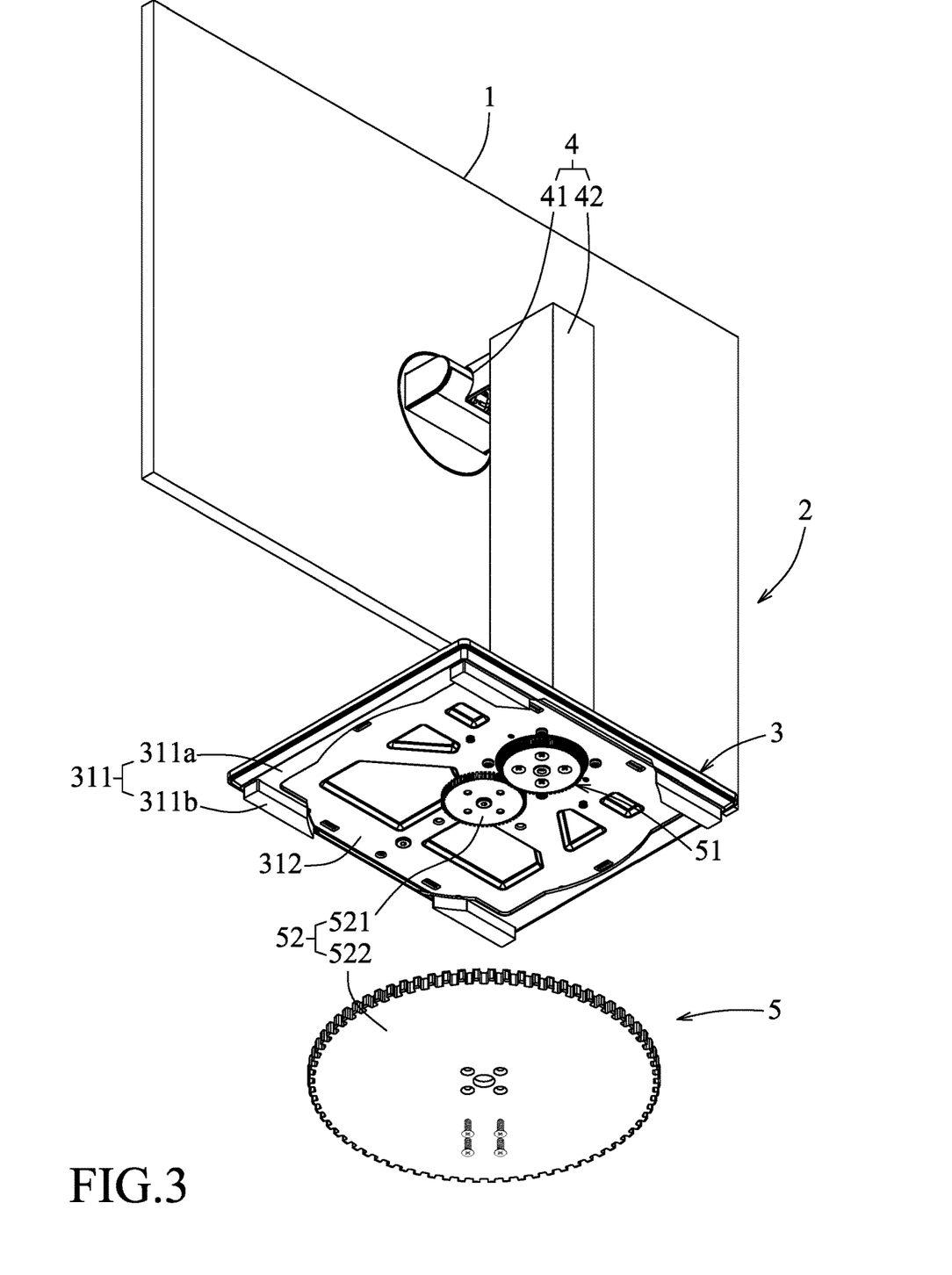
FIG. 3 is a partly exploded perspective view of the embodiment.
Figure 4:
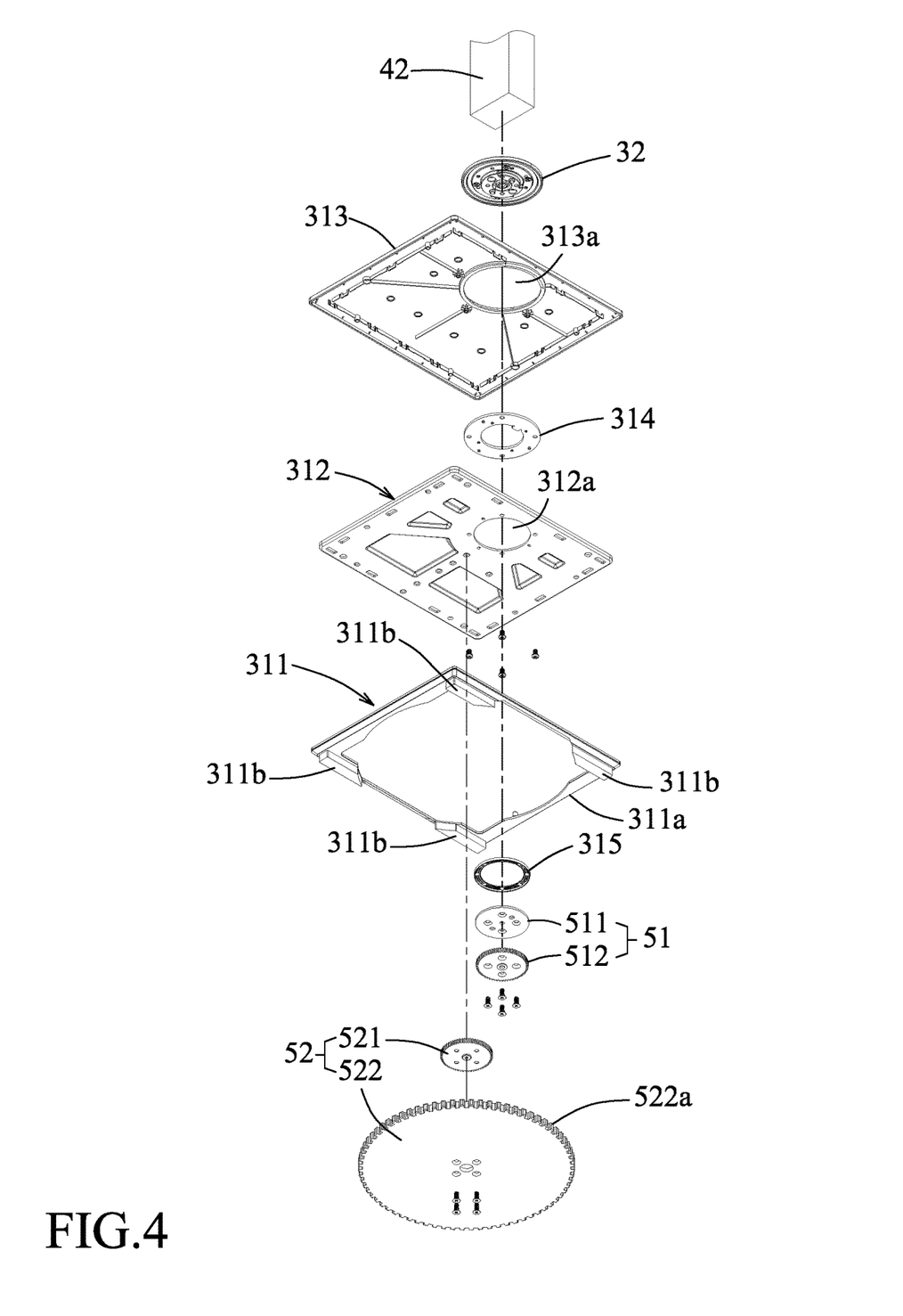
FIG. 4 is a fragmentary exploded perspective view of the embodiment.
Figure 5:
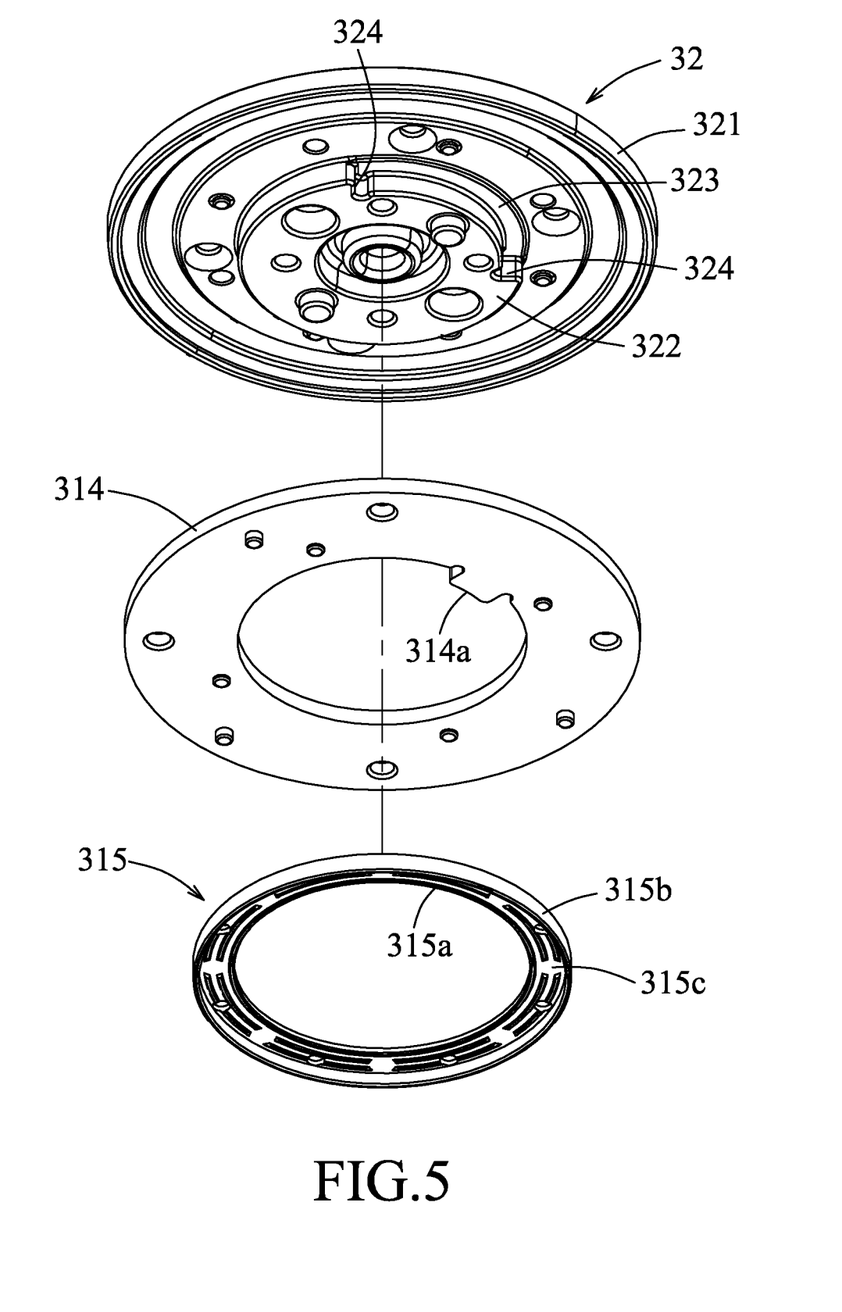
FIG. 5 is an exploded perspective view of a rotating seat, a securing ring, and a limiting ring of the embodiment.
Figure 6:
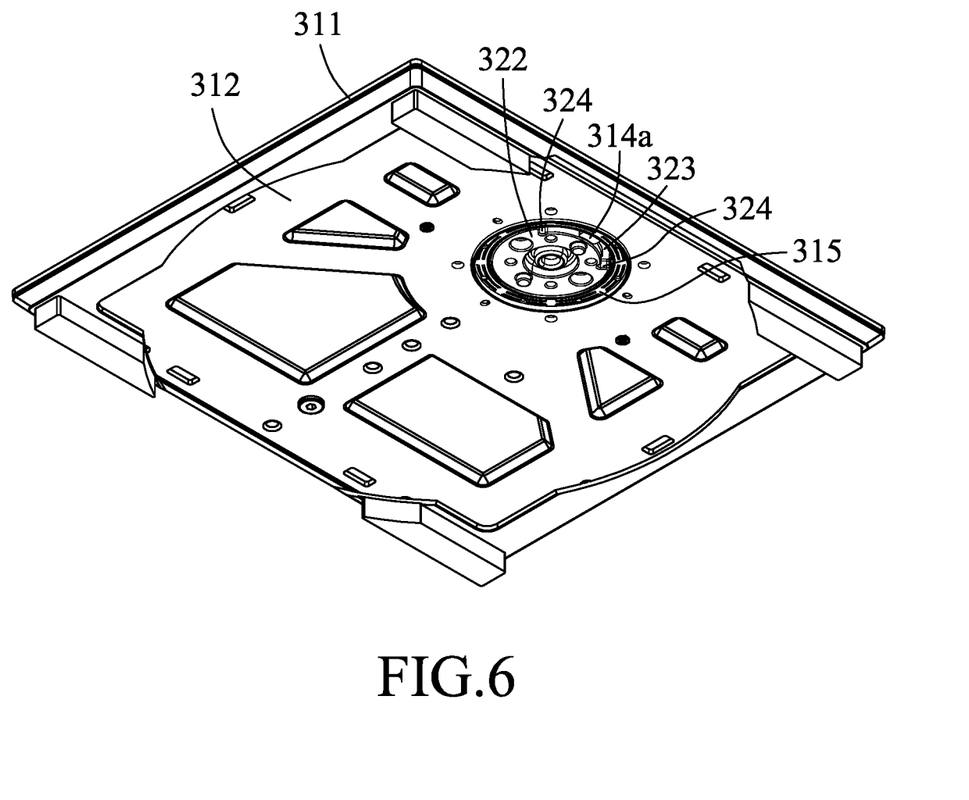
FIG. 6 is a perspective view illustrating structural relationships of the rotating seat, the securing ring, and the limiting ring with a load plate of the embodiment.
Figure 7:
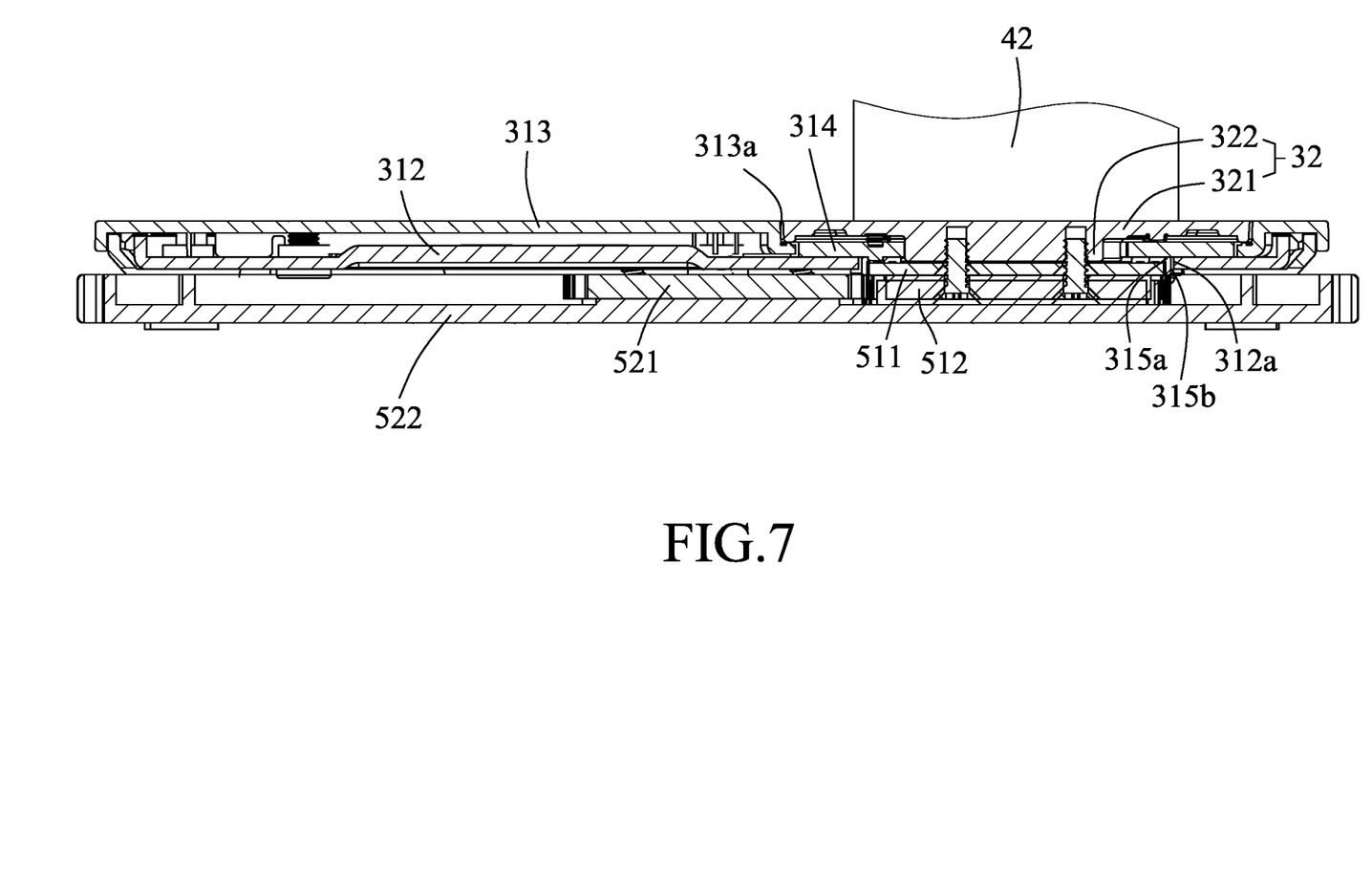
FIG. 7 is a sectional view taken along line VII-VII in FIG. 1.
Figure 8:
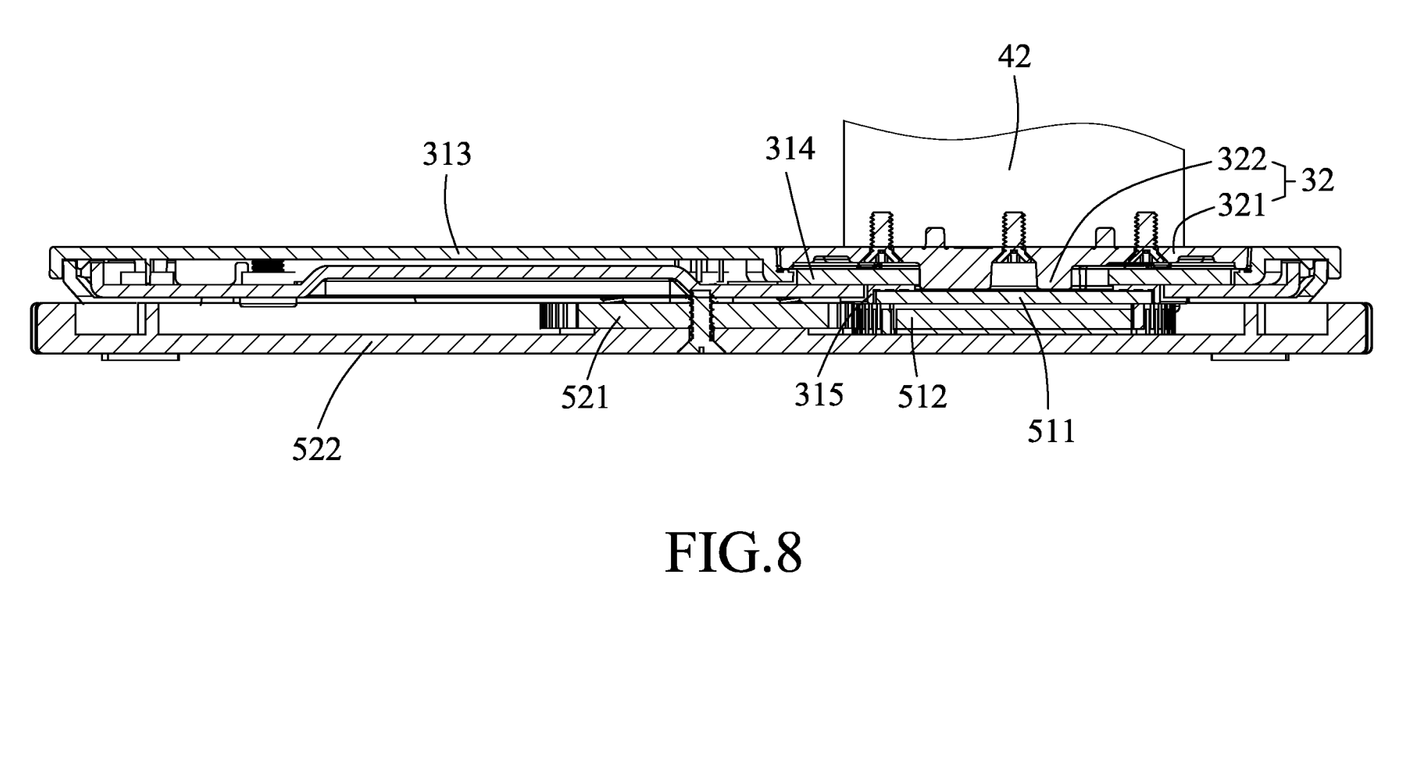
FIG. 8 is a sectional view taken along line VIII-VIII in FIG. 1.

Referring to FIGS. 1 to 3, an embodiment of a display device according to the disclosure includes a monitor 1 and a support module 2. The support module 2 includes a base frame 3, a support frame 4, and a driving unit 5. The base frame 3 includes a base seat 31 and a rotating seat 32 connected to the base seat 31 and rotatable about an axis.

The support frame 4 includes a connecting mechanism 41 connected to the monitor 1, and a support member 42 connected co-rotatably to the rotating seat 32 and connected to the connecting mechanism 41 for supporting the monitor 1. In this embodiment, the connecting mechanism 41 allows adjustment of a tilting angle of the monitor 1.

Figure 9:
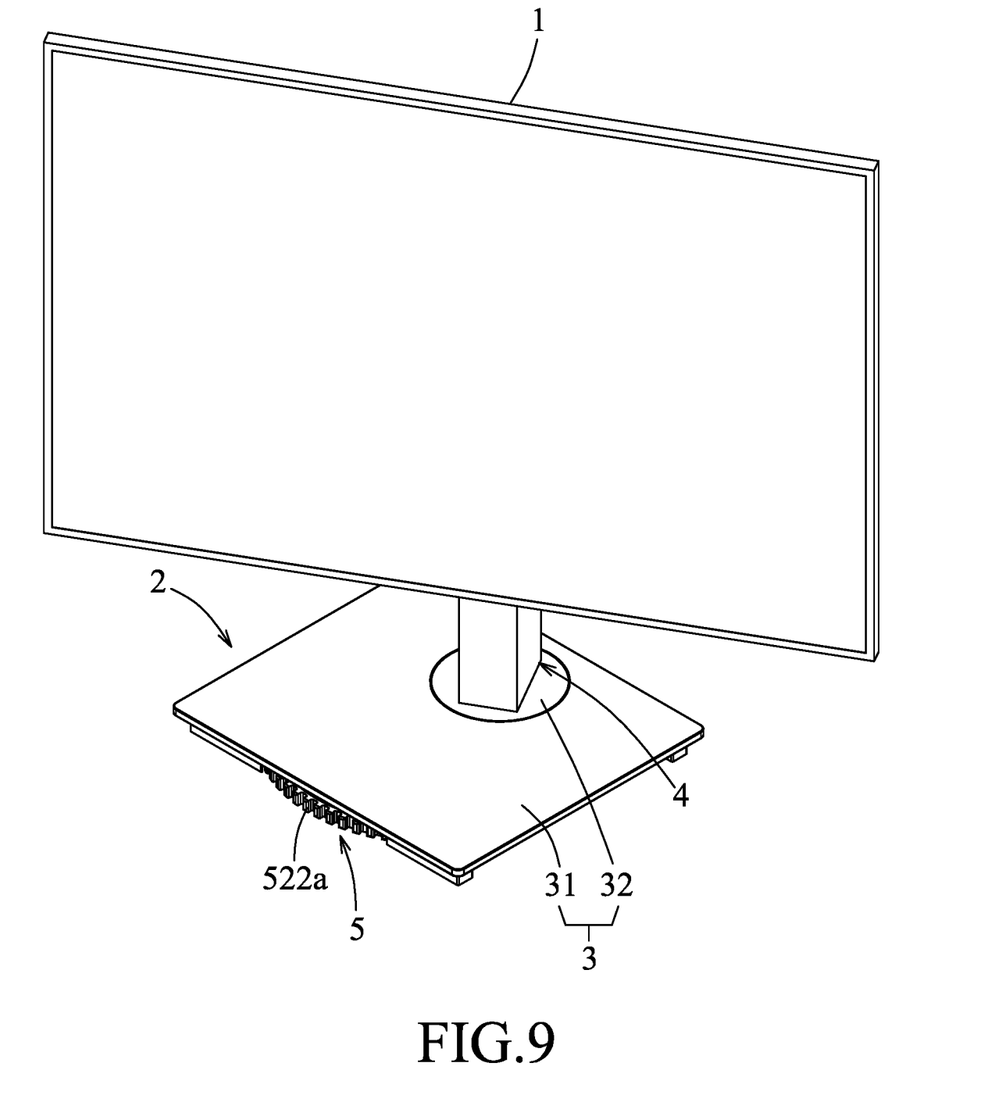
FIG. 9 is a perspective view illustrating a monitor of the embodiment being turned to the left from the perspective of the monitor.
Figure 10:
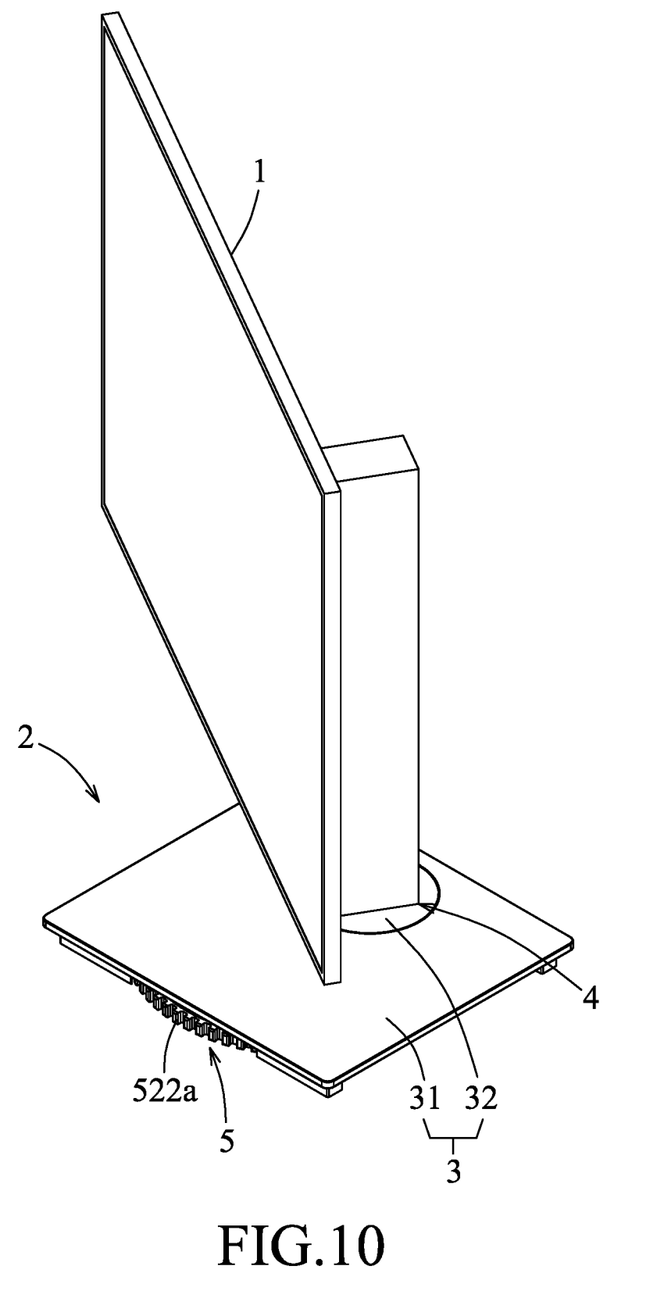
FIG. 10 is a perspective view illustrating the monitor of the embodiment being turned to the right from the perspective of the monitor.

The driving unit 5 includes a drive subunit 51 co-rotatably secured to the rotating seat 32, and a control subunit 52 mounted to the base seat 31, connected to the drive subunit 51, and being operable to drive rotation of the rotating seat 32 about the axis via the drive subunit 51, thereby rotating the monitor 1 about the axis. The monitor 1 may be rotated to the left (see FIG. 9) or to the right (see FIG. 10) of the monitor 1 from the perspective thereof.

Referring to FIGS. 4 to 7, in this embodiment, the base seat 31 includes a load frame 311, a load plate 312, a cover plate 313, a securing ring 314, and a limiting ring 315. The load frame 311 has a frame body 311a and four frame corner portions 311b connected to four corners of the frame body 311a. The load plate 312 is mounted to the load frame 311 and has a through hole 312a extending therethrough along the axis and aligned with the rotating seat 32. The control subunit 52 is mounted to the load plate 312. The cover plate 313 is coupled with the load frame 311, covers the load plate 312, and has a receiving hole 313a extending therethrough along the axis and receiving the rotating seat 32. The securing ring 314 is disposed above and secured to the load plate 312, aligned with the through hole 312a, and formed with a ring hole that is smaller than the through hole 312a of the load plate 312. The limiting ring 315 is fixedly secured to a bottom surface of the securing ring 314 and disposed in the through hole 312a of the load plate 312. The limiting ring 315 has a connecting wall 315a secured to the securing ring 314 and a surrounding wall 315b protruding downward from a periphery of the connecting wall 315a to define a limiting space 315c.

The rotating seat 32 has a plate portion 321, a projecting portion 322 protruding downward from the plate portion 321, an arc-shaped guide groove 323 defined by a periphery of the projecting portion 322, and two blocking portions 324 respectively defining two opposite ends of the guide groove 323. The securing ring 314 has a protruding portion 314a protruding into the guide groove 323 such that rotation of the rotating seat 32 about the axis relative to the base seat 31 is arrested when a corresponding one of the blocking portions 324 abuts against the protruding portion 314a. In other words, when the rotating seat 32 is rotated, the guide groove 323 rotates relative to the protruding portion 314a, and when one of the blocking portions 324 abuts against the protruding portion 314a, the rotating seat 32 is prevented from rotating further in a particular direction, thus the range of rotation of the rotating seat 32 is limited by the size of the guide groove 323, or a difference in angular positions of the two blocking portions 324 about the axis. Because the monitor 1 co-rotates with the support frame 4 and the support frame 4 co-rotates with the rotating seat 32, by limiting the range of rotation of the rotating seat 32, the range of rotation of the monitor 1 is also limited.

Referring to FIGS. 2, and 4 to 8, the drive subunit 51 includes a limited plate 511 and a driven gear 512. The limited plate 511 is disposed between the driven gear 512 and the rotating seat 32, and is coaxial with the driven gear 512 and the rotating seat 32. The limited plate 511, the driven gear 512 and the rotating seat 32 are secured to each other. In this embodiment, the limited plate 511, the driven gear 512 and the rotating seat 32 are secured to each other by screws, and the rotating seat 32 is secured to the supporting member 42 by screws also. The limited plate 511 is disposed in the limiting space 315c of the limiting ring 315 and corresponds in shape to the limiting ring 315 so as to be limited in horizontal movement by the limiting ring 315.

The control subunit 52 includes a driving gear 521 meshing with the driven gear 512, and an operation member 522 secured to the driving gear 521 and having an access portion 522a that protrudes out of a side edge of the load frame 311 for access to a user. In this embodiment, the operation member 522 is configured as a gear with the access portion 522a being configured as gear teeth, the operation member 522 is coaxial with the driving gear 521 and disposed below the driving gear 521 and the driven gear 512, and the access portion 522a further protrudes out of an opposite side edge of the load frame 311.

When the user operates on the access portion 522a to rotate the operation member 522, the driven gear 512 is driven to rotate through the driving gear 521 to bring the rotating seat 32 and the monitor 1 to co-rotate with the driven gear 512. Rotating the monitor 1 via the operation member 522 allows the monitor 1 to be more easily rotated as the operation member 522 has a relatively large radius, i.e., a longer arm of force, compared to the other elements, and allows the monitor 1 to be rotated without applying a force to the monitor 1 directly which could soil or damage the monitor 1.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A display device comprising:
a monitor; and
a support module including
　a base frame that includes a base seat and a rotating seat connected to said base seat and rotatable about an axis,
　a support frame that includes a connecting mechanism connected to said monitor, and a support member connected co-rotatably to said rotating seat and connected to said connecting mechanism, and
　a driving unit that includes a drive subunit co-rotatably secured to said rotating seat, and a control subunit mounted to said base seat, connected to said drive subunit, and being operable to drive rotation of said rotating seat about the axis via said drive subunit, thereby rotating said monitor about the axis,
wherein:
said drive subunit includes a driven gear,
said control subunit includes a driving gear meshing with said driven gear, and an operation member secured to said driving gear and having an access portion that protrudes out of a side edge of said base seat for access to a user,
said operation member is configured as a gear with said access portion being configured as gear teeth,
said operation member is coaxial with said driving gear and disposed below said driving gear and said driven gear, and
said access portion further protrudes out of an opposite side edge of said base seat.

2. The display device as claimed in claim 1, wherein:
said drive subunit further includes a limited plate secured to and coaxial with said driven gear and said rotating seat; and
said base seat has a limiting ring aligned with and corresponding in shape to said limited plate, said limited plate being rotatably received in said limiting ring.

3. The display device as claimed in claim 1, wherein:
said rotating seat has an arc-shaped guide groove, and two blocking portions respectively defining two opposite ends of said guide groove;
said base seat has a protruding portion protruding into said guide groove such that rotation of said rotating seat about the axis relative to said base seat is arrested when a corresponding one of said blocking portions abuts against said protruding portion.

4. The display device as claimed in claim 1, wherein said base seat includes:
a load frame;
a load plate mounted to said load frame and having a through hole that extends therethrough along the axis and that is aligned with said rotating seat, said control subunit being mounted to said load plate; and a cover plate coupled with said load frame, covering said load plate, and having a receiving hole that extends therethrough along the axis and that receives said rotating seat.

5. The display apparatus as claimed in claim 4, wherein said access portion of said operation member protrudes out of a side edge of said load frame for access to a user.

6. The display apparatus as claimed in claim 5, wherein said access portion further protrudes out of an opposite side edge of said load frame.

7. The display apparatus as claimed in claim 5, wherein:
said rotating seat has an arc-shaped guide groove, and two blocking portions respectively defining two opposite ends of said guide groove;
said base seat further includes a securing ring disposed above said load plate, aligned with said through hole, formed with a ring hole that is smaller than said through hole of said load plate, and having a protruding portion that protrudes into said guide groove such that rotation of said rotating seat about the axis relative to said base seat is arrested when a corresponding one of said blocking portions abuts against said protruding portion.

8. The display apparatus as claimed in claim 7, wherein:
said drive subunit further includes a limited plate secured to and coaxial with said driven gear and said rotating seat; and
said base seat has a limiting ring aligned with and corresponding in shape to said limited plate, connected to a bottom surface of said securing ring, and disposed in said through hole of said load plate, said limited plate being rotatably received in said limiting ring.

\* \* \* \* \*